United States Patent
Uchiyama et al.

(10) Patent No.: US 7,942,340 B2
(45) Date of Patent: May 17, 2011

(54) TWO-DIMENSIONAL CODE, AND METHOD AND APPARATUS FOR DETECTING TWO-DIMENSIONAL CODE

(75) Inventors: Shinji Uchiyama, Yokohama (JP); Neesha Subramaniam, New York, NY (US); Kiyohide Satoh, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 753 days.

(21) Appl. No.: 11/562,216

(22) Filed: Nov. 21, 2006

(65) Prior Publication Data

US 2007/0125862 A1    Jun. 7, 2007

(30) Foreign Application Priority Data

Nov. 24, 2005   (JP) ................. 2005-339079
Nov. 24, 2005   (JP) ................. 2005-339080

(51) Int. Cl.
    *G06K 19/06*    (2006.01)
(52) U.S. Cl. ...................... 235/494; 235/460
(58) Field of Classification Search ............ 235/494, 235/460; 283/81, 93, 108
    See application file for complete search history.

(56) References Cited

U.S. PATENT DOCUMENTS

| | | | | |
|---|---|---|---|---|
| 4,874,936 A | * | 10/1989 | Chandler et al. | 235/494 |
| 4,998,010 A | * | 3/1991 | Chandler et al. | 235/494 |
| 6,088,482 A | * | 7/2000 | He et al. | 382/202 |
| 6,094,509 A | * | 7/2000 | Zheng et al. | 382/218 |
| 6,135,353 A | * | 10/2000 | Konosu et al. | 235/462.09 |

OTHER PUBLICATIONS

X. Zhang, S. Fronz, N. Navab: "Visual marker detection and decoding in AR systems: A comparative study," Proc. of International Symposium on Mixed and Augmented Reality (ISMAR'02), 2002.

* cited by examiner

*Primary Examiner* — Thien M Le
(74) *Attorney, Agent, or Firm* — Canon USA Inc. IP Division

(57) ABSTRACT

A two-dimensional code includes a polygonal exterior region distinguishable from a background on the basis of brightness or color and an interior region disposed at a predetermined distance from the perimeter of the exterior region. The interior region is divided into cells of a predetermined size so that information is represented by brightness or color of each of the cells. The cells, each having the shape of a hexagon, are disposed so as to abut each other.

8 Claims, 18 Drawing Sheets

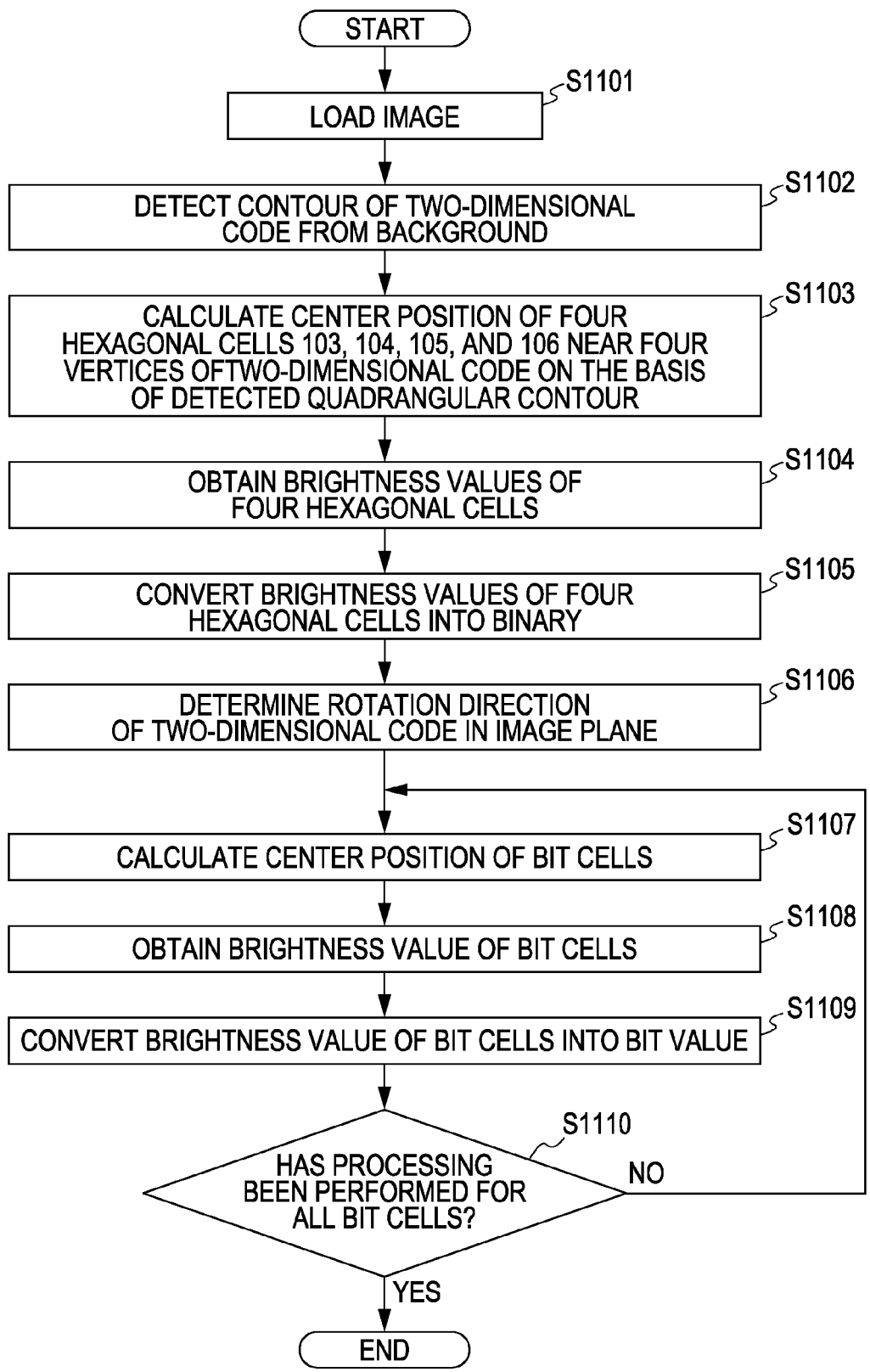

TWO-DIMENSIONAL CODE, AND METHOD AND APPARATUS FOR DETECTING TWO-DIMENSIONAL CODE

BACKGROUND OF THE INVENTION

1. Field of the Invention

The present invention relates to a configuration of a two-dimensional code and to a method and an apparatus for detecting a two-dimensional code from an image.

2. Description of the Related Art

[Related Art 1]

A known two-dimensional code called MaxiCode is shown in FIG. 18. In this two-dimensional code, tiny regular hexagonal cells are regularly arranged around concentric ring-like black and white regions having different radii which are positioned at a center part of the two-dimensional code. Each of the regular hexagonal cells is colored black or white, thereby representing binary information. The content of the code is read out by capturing an image of the code using a camera or the like. This type of two-dimensional code will hereinafter be referred to as "two-dimensional code 1".

Two-dimensional codes shown in FIGS. 19 and 20 are also known. Each of these two-dimensional codes has a square exterior region which can be distinguished from the background on the basis of the brightness, and small square cells formed by dividing an interior region of the code into equally sized regions. Information is expressed by the brightness/darkness of the small square cells. Normally, an image of such a two-dimensional code is captured by a camera, and the perimeter (contour) or external shape of the code is identified and detected from the captured image. Information represented by the code is read out on the basis of the brightness of each of the small square cells allocated within the detected perimeter (contour). This type of two-dimensional code will hereinafter be referred to as "two-dimensional code 2".

In general, "two-dimensional code 1" and "two-dimensional code 2" are to be attached to an article or the like and used to manage information such as manufacturing information including the product number, product ID, and manufacturing date, and transportation information including the origin, destination, and transportation date/time. Reading of such a two-dimensional code is performed on the premise that the image of the code is captured by a camera from a position generally right in front of the code (i.e., a position at which the optical axis of the camera is generally exactly perpendicular to the code) and that the captured code image is sufficiently large.

[Related Art 2]

In the field of mixed reality (MR), in which a virtual object is superimposed on a real space so as to be displayed in the real space, the following processing is performed to render a virtual image. The position and orientation of a real camera with respect to a square marker disposed in the real space are estimated. On the basis of the estimated position and orientation of the real camera, parameters of the virtual camera are set. Then, a virtual image is rendered on the basis of the set parameters.

An example of a technique used in such MR applications is ARToolkit, which is described in X. Zhang, S. Fronz, N. Navab: "Visualmarker detection and decoding in AR systems: A comparative study," Proc. of International Symposium on Mixed and Augmented Reality (ISMAR'02), 2002 (hereinafter referred to as "Zhang et al."). In ARToolkit, a marker having a square perimeter (contour) or external shape as shown in FIG. 21 is used. A quadrangular shape of the marker perimeter (contour) is detected from a captured image. Then, a position and orientation of a camera are estimated on the basis of how the detected quadrangular shape is deformed from the original square shape (i.e., the detected quadrangle is distorted by the effect of perspective projection). Further, in order to distinguish a marker from a plurality of markers, the interiors of the individual markers are applied with different patterns. Each of the markers is distinguished by performing processing called pattern matching on the pattern inside the quadrangle obtained from the captured image. This type of two-dimensional code will hereinafter be referred to as "two-dimensional code 3".

Another example of a marker used in MR applications is shown in FIG. 22, which is described in "Zhang et al.". This marker is different from "two-dimensional code 3" in that the interior of the marker is divided into a 4×4 grid pattern. In addition, a function of distinguishing each marker is realized on the basis of whether or not each of the circular regions, with its center at the center of one of the divided grid cells, is black. However, this marker is the same as "two-dimensional code 3", in that the position and orientation of a camera are estimated on the basis of the original square contour. This type of two-dimensional code will hereinafter be referred to as "two-dimensional code 4".

Other types of marker having square contours have been proposed in the field of MR. For example, a marker shown in FIG. 23 has a plurality of small square cells disposed outside its square contour. These small square cells are used to identify a rotation direction of the square contour within a captured image. The interior of the marker is divided into 4×4 square cells. Information for distinguishing the marker is represented by the brightness of each of the small square cells. This type of two-dimensional code will hereinafter be referred to as "two-dimensional code 5".

A feature common to the above-described "two-dimensional code 3", "two-dimensional code 4", and "two-dimensional code" for MR applications is that all they have a square contour.

"Two-dimensional code 1" described in "Related Art 1" has concentric circles disposed at the center of the code which are surrounded by small regular hexagonal cells. These regular hexagonal cells are interlocked with each other, and each is colored either black or white. These black and white cells represent binary data. The positions of the hexagonal cells are identified using lines as references which radiate from the innermost concentric circle at 60 degree intervals. In other words, only when the image of "two-dimensional code 1" is captured from a position generally right in front of the code (index) (i.e., when the image is captured using a camera having an optical axis generally along a normal to the plane to which the index is attached), can the index be detected. This is true for "two-dimensional code 2". Capturing of images of the two-dimensional codes of Related Art 1 described above is performed on the premise that images of the indices are captured from a position at which the optical axis of the camera is generally exactly perpendicular to the plane of the indices, and it is not intended for images to be captured from an arbitrary position at which the optical axis of the camera is not exactly perpendicular to the plane of the indices.

Every one of "two-dimensional code 3", "two-dimensional code 4", and "two-dimensional code 5" described above has an exterior region having a square contour. The brightness of this region is lower than that of the background. In a technique of Related Art 2, estimation calculation is performed for determining the position and orientation of a camera with respect to a two-dimensional code, on the basis of deformation of the contour of the code. The deformation occurs due to the projection of a three-dimensional feature onto a two-dimensional plane. That is, capturing of images of the indices of Related Art 2 is not performed on the premise that their images are captured from a direction exactly perpendicular to the plane of the indices. Rather, capturing of image of these indices is performed on the premise that the images are captured from a direction that possibly deviates from the direction normal to the plane of the indices.

For "two-dimensional code 3", in order to distinguish individual indices, arbitrary patterns in the interior of the square contours are identified through a pattern matching technique. Patterns in the interiors of the indices are independently stored in advance for use in pattern matching. Then, after an image obtained by clipping the interior region of the index out of a captured image is normalized, the normalized image and a stored pattern are compared so that the index is identified on the basis of whether or not the normalized image resembles the stored pattern. This technique, however, has a disadvantage in that the number of pairs to be pattern-matched increases as the number of patterns to be used or indices to be image-captured at the same time increases. This may result in a significant increase in the time necessary for calculations. In addition, an increase in the number of patterns produces similar patterns, causing possible misrecognition of the patterns. Thus, not more than approximately several tens of patterns can actually be used at the same time.

On the other hand, in "two-dimensional code 4" and "two-dimensional code 3", the interior region is equally divided into small square cells, and a bit value is represented by the brightness (black or white) of each cell. Thus, "two-dimensional code 4" and "two-dimensional code 5" are free from the disadvantage associated with "two-dimensional code 3" described above. However, "two-dimensional code 4" and "two-dimensional code 5" still have a room for improvement as described below.

In order for a two-dimensional code to contain as much information as possible, it is necessary to increase the number of bit cells. However, since individual bit cells have to be recognized from a captured image, there is a limitation in decreasing the size of each bit cell. In other words, the recognizability of the two-dimensional code depends on the size of a bit cell captured/projected on an image. In general, a smaller two-dimensional code is desirable for MR applications. However, when amount of information to be recorded in the two-dimensional code is increased, the size of the two-dimensional code has to be physically increased so that it appears sufficiently large in the captured image. That is, the size of a two-dimensional code and the amount of information contained therein are in a trade-off relationship. Thus, in order to decrease the size of the two-dimensional code and also to record as much information as possible, it is desired to arrange bit cells with high density in the interior region of the code.

"Two-dimensional code 4" has circular interior bit cells arranged in square grid. With this type of two-dimensional code, the size of spaces between the circular cells becomes important when the size of each circular bit cell is decreased. For example, when the size a circular bit cell colored black is decreased to the size of the width of a pixel in a captured image, the cell will appear to be mixed with white space around the cell, creating a region of neutral brightness. This results in an increase in the number of errors in bit readout. That is, it is desirable that the interior cells are arranged close together without spaces therebetween.

In "two-dimensional code 5", the interior region is equally divided into square bit cells which are adjacent to each other. Thus, this type of two-dimensional code is free from the above problem associated with "two-dimensional code 4". In addition, the marker can be detected even when the image within which it appears is captured from a direction which is not exactly perpendicular to the plane of the marker. Thus, it is not definite from which direction the image of interior small square cells will be captured. That is, it is indefinite what types of quadrangular shape of these cells will appear in a projected image. In "two-dimensional code 5", processing for converting the code into a bit-based representation is performed on the basis of the brightness of the individual square cells in a captured image. Thus, when the brightness is read, the brightness of the center point of each square cell (brightness reference point) is to be read out. In order to accurately read the brightness, it is necessary to capture the image of the code so that there is a sufficient constant distance between the brightness reference points of the square cells in the captured image. In other words, when the image of the cells in the original index is projected onto an image plane, the closer to a circular shape, with its center at the brightness reference point, each cell in the projected image appears in the image plane, the more the size of the cells in the original index can be decreased. The number of bits to be allocated for the entire index area can be increased by decreasing the size of the cells, each cell representing a bit value. In contrast, when the cells are in the shape of a square, indicating each cell appears quadrangular with corners in the image plane, these cells may not be arranged efficiently with high density.

On the other hand, in "two-dimensional code 4", individual bit cells are circular. However, there are unnecessary spaces between the cells, and thus these cells may not be arranged with high density.

SUMMARY OF THE INVENTION

The present invention has been made in view of the above circumstances. As can be seen from the foregoing, there is a room for improvement in "two-dimensional code 4" and "two-dimensional code 3" in terms of the density of arrangement of bit cells.

A two-dimensional code according to an aspect of the present invention includes a polygonal exterior region distinguishable from a background on the basis of brightness or color and an interior region disposed at a predetermined distance from the perimeter of the exterior region. The interior region is divided into cells of a predetermined size so that information is represented by brightness or color of each of the cells. The cells each having the shape of a hexagon are disposed so as to abut each other.

A method for detecting a two-dimensional code according to an aspect of the present invention includes the steps of detecting a polygonal exterior region of two-dimensional code projected on an image from a background, determining a position of an interior bit cell in accordance with the shape of the polygonal exterior region in the image, and acquiring a bit value on the basis of brightness or color of the bit cell. The two-dimensional code includes a hexagonal exterior region distinguishable from the background on the basis of brightness or color and an interior region disposed at a predetermined distance from the perimeter of the hexagonal exterior region, the interior region having a plurality of hexagonal bit cells, the bit cells disposed so as to abut each other.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 11 is a flowchart illustrating a processing procedure performed by a two-dimensional code detector according to an exemplary embodiment of the present invention.

DESCRIPTION OF THE PREFERRED EMBODIMENTS

Preferred embodiments of the present invention will now be described in detail in accordance with the accompanying drawings.

First Exemplary Embodiment

Figure 1A:
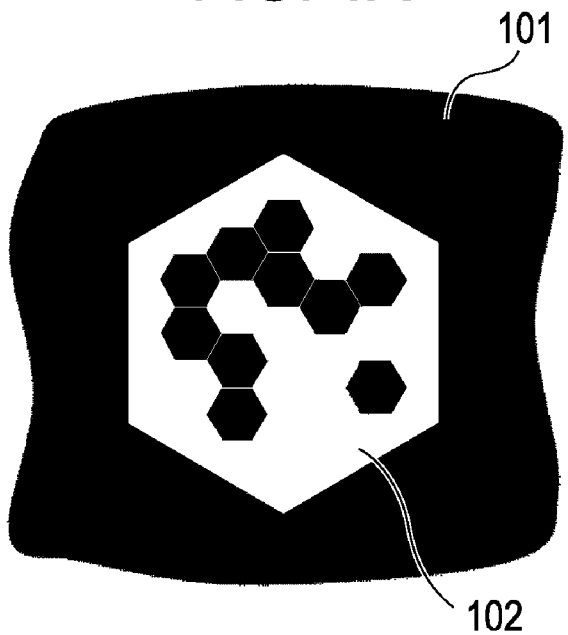
FIGS. 1A to 1C illustrate a configuration of a two-dimensional code according to an exemplary embodiment of the present invention.
Figure 1B:
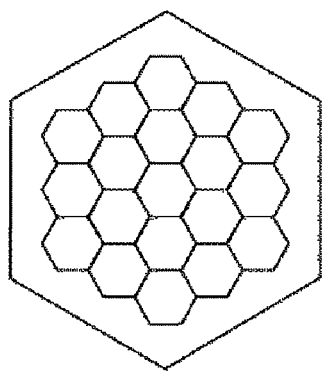
Figure 1C:
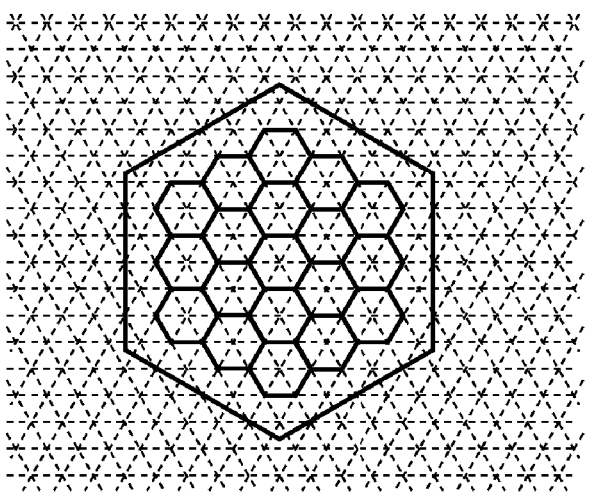

Referring to FIGS. 1A to 1C, a two-dimensional code according to an exemplary embodiment of the present invention is illustrated. FIG. 1A illustrates a two-dimensional code 102 having a white-colored regular hexagonal exterior region and formed on a black background 101. A region is provided in the interior of the two-dimensional code 102 at a predetermined distance from the regular hexagonal perimeter (contour) of the two-dimensional code 102. This interior region is divided into regular hexagonal cells each of which is colored either black or white. A relationship between each of the cells and the outer perimeter (contour) is illustrated in FIG. 1B. In this example, the hexagonal cells are arranged so as to be tilted by 30 degrees with respect to a diagonal of the hexagonal perimeter (contour). The length of the space between each of the hexagonal cells and the outer perimeter (contour) is set to be half the length of a line diagonally bisecting the hexagonal cell. FIG. 1C illustrates this arrangement. As shown in the figure, triangular mesh expressed by dotted lines is overlaid on the two-dimensional code in FIG. 1B as additional lines. This triangular mesh is composed of groups of parallel lines at regular intervals which are placed every 120 degrees.

Thus, in the two-dimensional code 102 illustrated in FIGS. 1A to 1C, hexagonal cells are arranged so that a line diagonally connecting vertices of the hexagonal outer perimeter (contour) and any opposing side of a regular hexagonal cell intersect at right angles.

Figure 3:
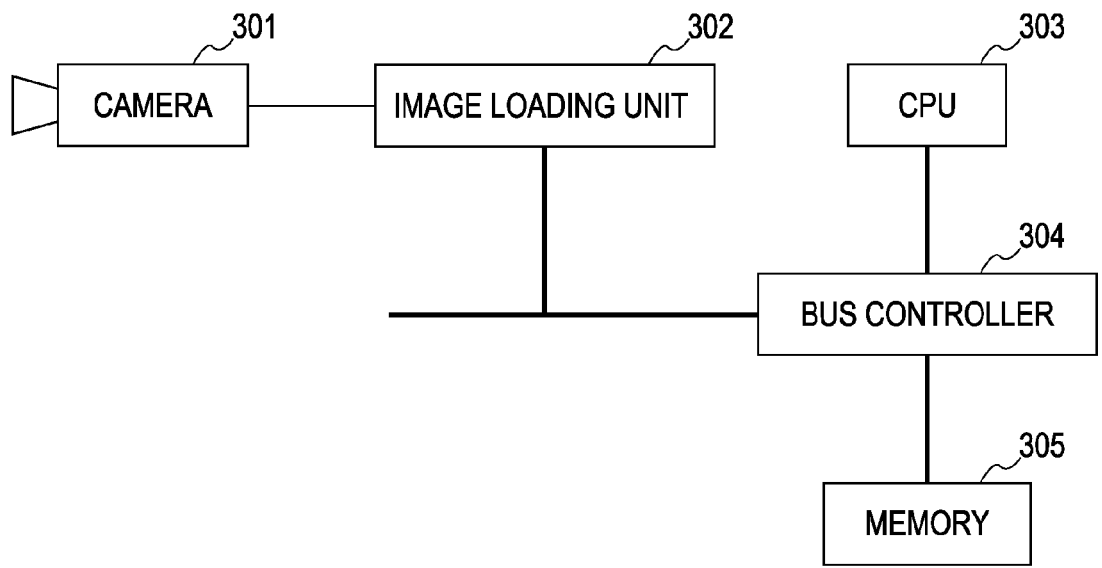
FIG. 3 is a block diagram illustrating a two-dimensional code detector according to an exemplary embodiment of the present invention.

In the following, an example of a preferred configuration of a two-dimensional code detector for reading a two-dimensional code will be described. FIG. 3 is a block diagram illustrating a configuration of a two-dimensional code detector for detecting such a two-dimensional code illustrated in FIG. 1.

The two-dimensional code detector includes a camera 301 for capturing an image of the two-dimensional code in FIG. 1. The captured image is written to a memory 305 through an image loading unit 302 on the basis of arbitration of a bus controller 304. The memory 305 has recorded therein a program for executing a processing procedure according to an exemplary embodiment of the present invention. A CPU (central processing unit) 303 executes processing in accordance with the procedure. The bus controller 304 performs arbitration for input/output of data between the CPU 303, the image loading unit 302, and the memory 305.

Figure 4:
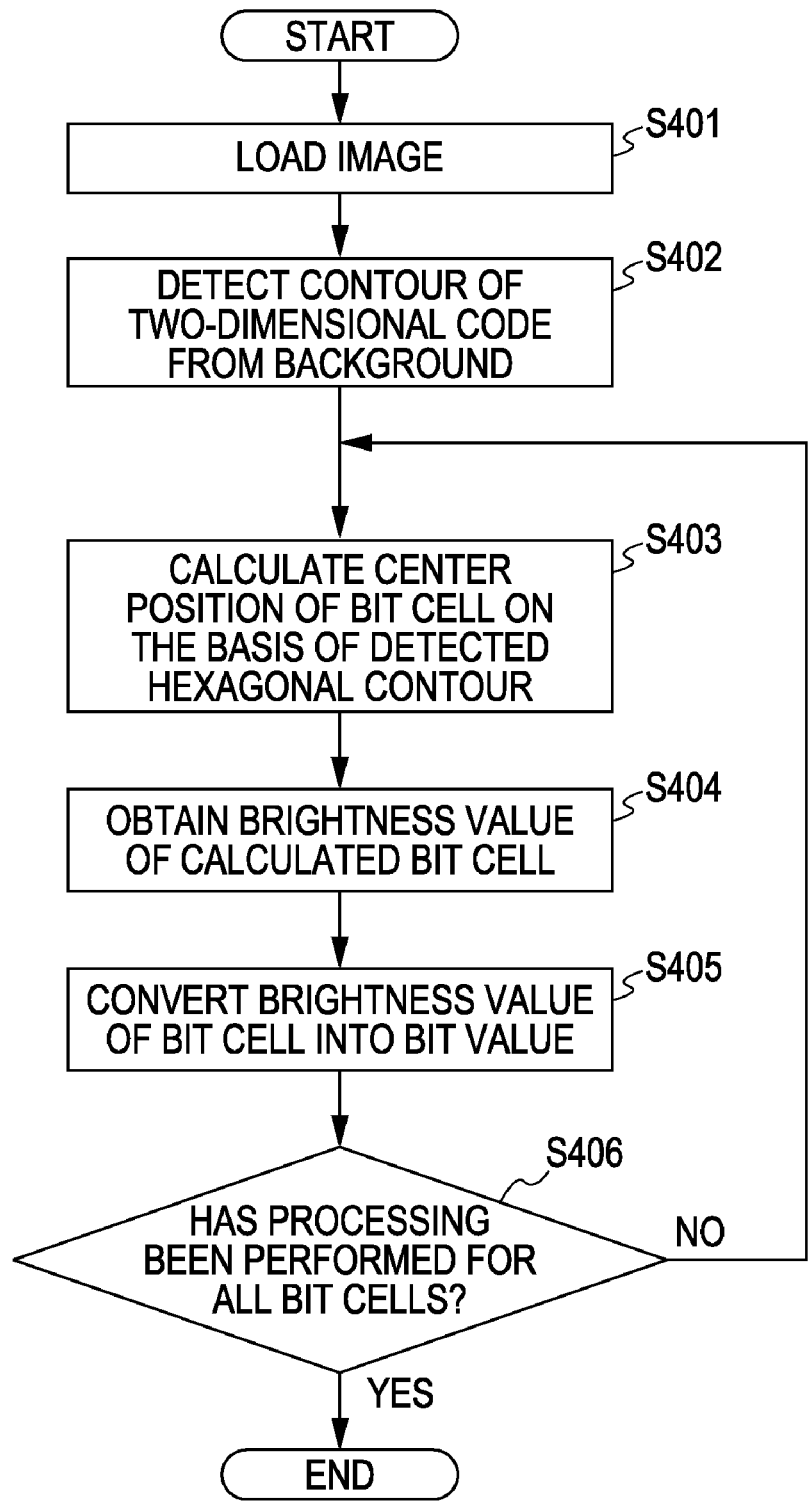
FIG. 4 is a flowchart illustrating a processing procedure performed by a two-dimensional code detector according to an exemplary embodiment of the present invention.

Referring to FIG. 4, a flowchart illustrates a processing procedure of the two-dimensional code detector illustrated in FIG. 3.

At STEP S401, an image of the two-dimensional code is captured by the camera 301, and the captured image is acquired through the image loading unit 302. At STEP S402, a hexagonal shape, which is the outer perimeter (contour) of the two-dimensional code (index) projected on the image, is detected. This image capturing by the camera 301 is not necessarily performed with the orientation of the camera that allows the optical axis of the camera to be exactly perpendicular to the plane of the index. Rather, when used in MR applications, the index image can be captured from various directions. In this case, the vertical and horizontal axes of the image plane and the sides of the hexagonal perimeter (contour) of the index are not necessarily lined up.

Figure 5A:
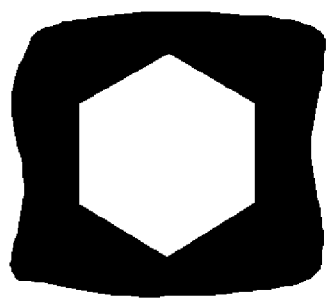
FIGS. 5A to 5E are schematic diagrams illustrating a method for detecting a square contour of a two-dimensional code.
Figure 5B:
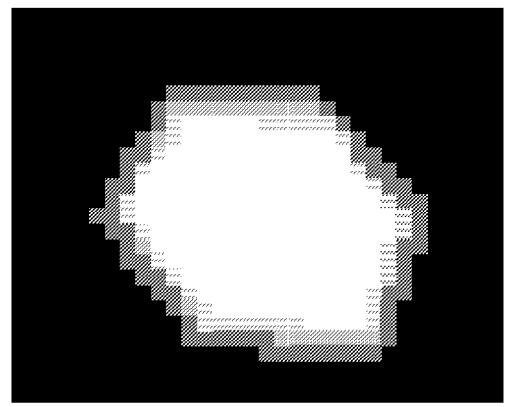
Figure 5C:
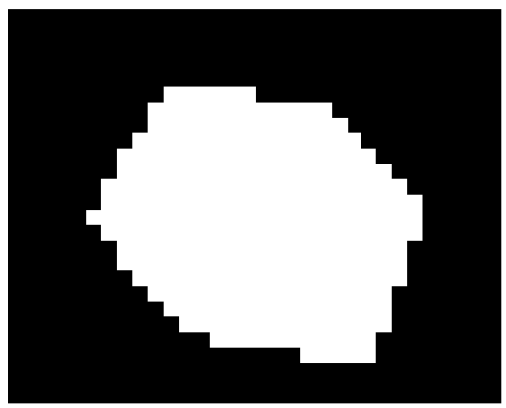
Figure 5D:
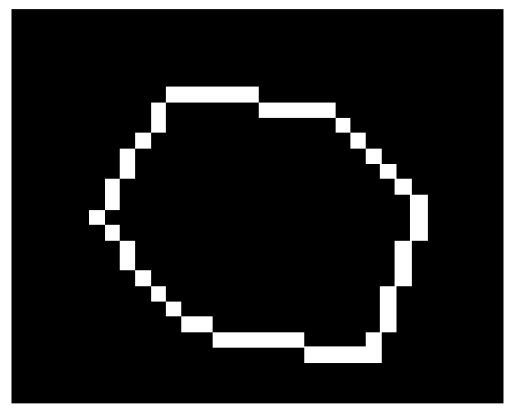
Figure 5E:
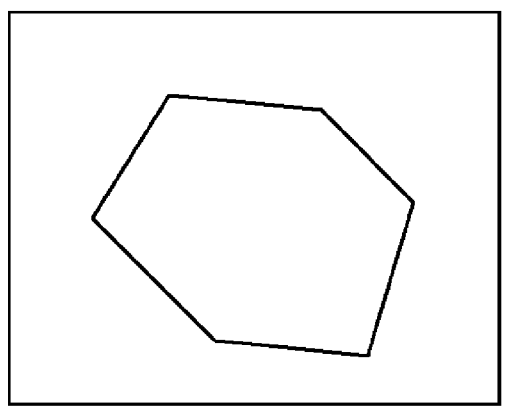

The processing of STEP S402 for detecting the outer perimeter (contour) will be described with reference to FIGS. 5A to 5E. FIG. 5A shows the index viewed from a direction exactly perpendicular to the plane of the index. The interior cells are not shown in this figure, and the cells are disregarded in this description of the processing of STEP S402. An image illustrated in FIG. 5B, for example, can be capture by a camera. Even when the index has a regular hexagonal shape, the index in the captured image may appear to be a convex hexagon unless the index is captured from a position at which the optical axis of the camera is perpendicular to the plane of the index. In addition, the index in the image can be oriented in any direction. Further, a black region and a white region in the captured image serve to represent the level of brightness, and a border region between the black regions and white regions represents an intermediate brightness level. FIG. 5C shows a binary image obtained by binarizing the image shown in FIG. 5B. This image binarization can be realized through simple threshold processing. However, any binarization scheme can be applied to obtain such an image. From this binary image, pixels forming the perimeter (contour) of the white region are detected through a pixel tracing technique, so that a pixel alignment forming a closed loop having a width of one pixel as illustrated in FIG. 5D is obtained. When broken line approximation is performed on this pixel alignment, a hexagon illustrated in FIG. 5E is obtained. At this time, in a case where the original shape of an index is not hexagon, it can be found through the broken line approximation that the number of break points is not six. Thus, it can be determined whether or not the original shape is hexagon.

In the above description of the processing of STEP S402, the bit cells in the internal region of the index are disregarded. However, since a space is provided between the interior bit cells and the hexagonal perimeter (contour), the interior cells do not affect the processing of STEP S402 as long as the index occupies more than a predetermined amount of area in the image plane (i.e., the image is captured so that the width of the space is more than the width of one pixel in the captured image).

Figure 6:
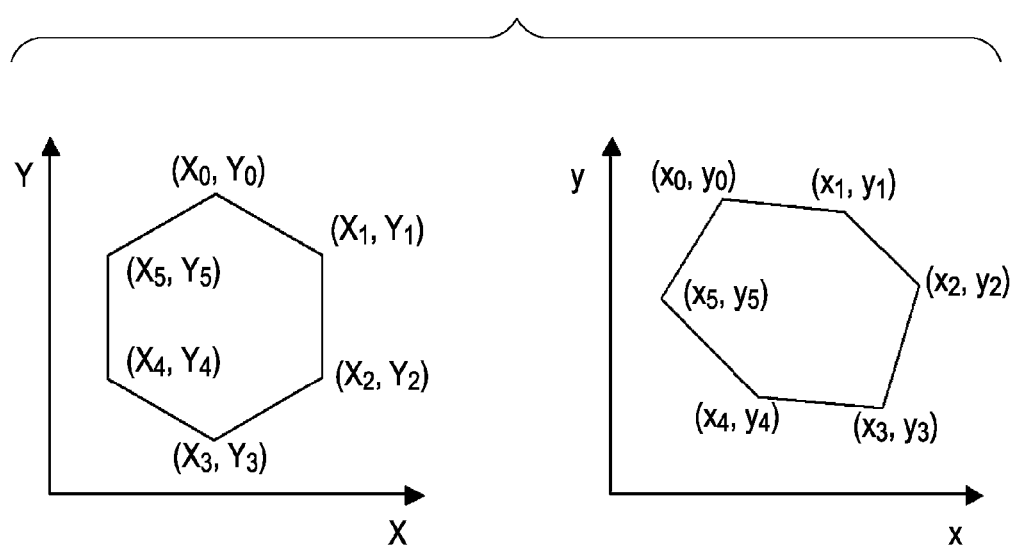
FIG. 6 is a schematic diagram showing an original hexagonal contour of a two-dimensional code and a contour of the two-dimensional code obtained on a projected image and illustrating projective transformation between the original contour and projected contour.

Then, at STEP S403, the center positions of the individual interior bit cells are calculated on the basis of the detected hexagonal contour. This calculation is described with reference to FIG. 6. As shown in the figure, the vertices of the regular hexagon, which is the original contour of the index, are ordered as (Xn, Yn) (n=0, 1, . . . , 5), and the vertices of the hexagonal contour detected in the image are ordered as (xn, yn). These hexagons are related by two-dimensional projective transformation which is expressed by the equations below.

$$x_n = \frac{H_{11}X_n + H_{12}Y_n + H_{13}}{H_{31}X_n + H_{32}Y_n + 1}, y_n = \frac{H_{21}X_n + H_{22}Y_n + H_{23}}{H_{31}X_n + H_{32}Y_n + 1} \quad (1)$$

This relational expression can be written as a homogeneous coordinate transformation equation by a matrix operation shown below.

$$\begin{bmatrix} wx_n \\ wy_n \\ w \end{bmatrix} = \begin{bmatrix} H_{11} & H_{12} & H_{13} \\ H_{21} & H_{22} & H_{23} \\ H_{31} & H_{32} & 1 \end{bmatrix} \begin{bmatrix} X_n \\ Y_n \\ 1 \end{bmatrix} \quad (2)$$

In this case, the matrix $$\begin{bmatrix} H_{11} & H_{12} & H_{13} \\ H_{21} & H_{22} & H_{23} \\ H_{31} & H_{32} & 1 \end{bmatrix} \quad (3)$$

is called a homography matrix. The vertices (Xn, Yn) and (xn, yn) have six corresponding points. Six relational expressions of the equation (1) and the associated equation (2) can be derived. In other words, by solving simultaneous equations, eight parameters H11, H12, H13, H21, H22, H23, H31, and H32 in the above homography matrix (3) or the equation (1) can be derived from the relation between the six corresponding points. Since the number of the unknowns is eight, four corresponding points are necessary for uniquely defining the eight unknowns. Thus, calculation of the eight parameters from the six corresponding points causes redundancy in the simultaneous equations, and it is desirable the parameters are calculated using the least squares method or the like.

Figure 7:
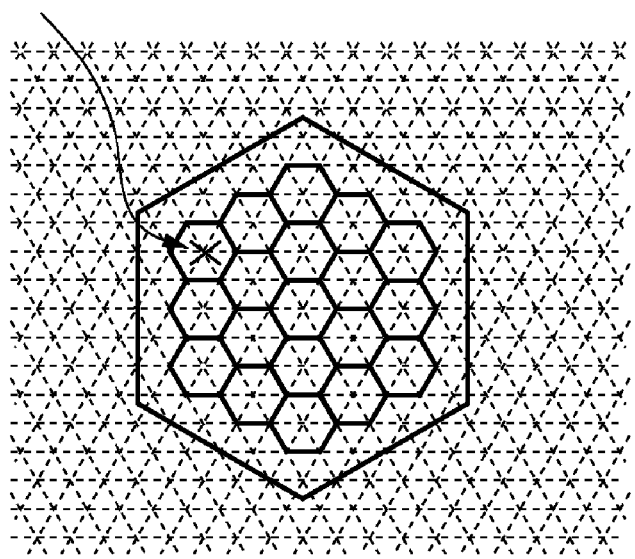
FIG. 7 is a schematic diagram illustrating a scheme for calculating a center position of an interior bit cell on the basis of a detected hexagonal contour.

Once the relational expressions shown in the equation (1) or (2) are obtained, any point in space (X, Y) can be mapped into space (x, y). That is, the equation allows calculation of the position where the center point of an arbitrary bit cell in the index appears on a projected image. For example, referring to FIG. 7, the coordinate of a center point 701 in the projected image can be obtained. With the arrangement described above, the positions at which the center points of the internal bit cells appear in a projected image plane can be calculated in the processing of STEP S403.

Figure 8:
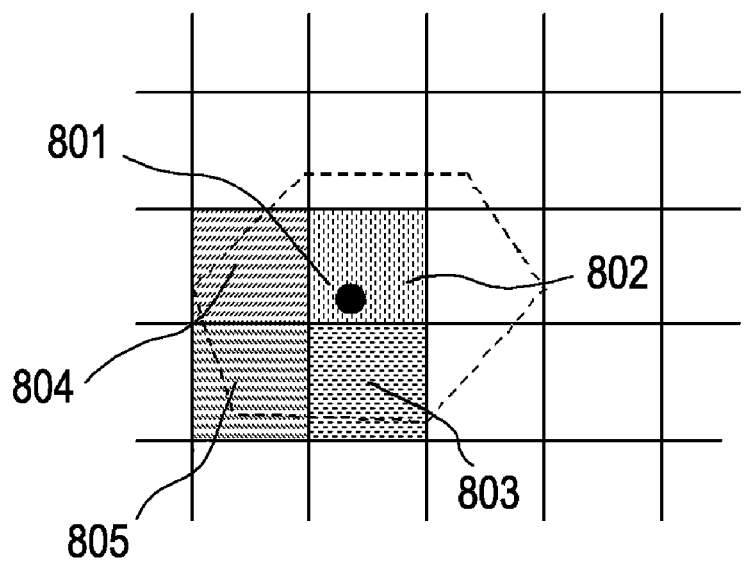
FIG. 8 is a schematic diagram illustrating a relation between a center point of a specific bit cell and neighborhood pixels in a projected image of a two-dimensional code.

Subsequently, at STEP S404, the brightness values of the obtained center positions of the individual bit cells in the image plane are obtained. Since the center positions calculated in the processing of STEP S403 are based on projective transformation associated with the image capturing of the hexagonal contour, the brightness values will not necessarily be integer values. That is, the brightness values to be obtained do not directly represent corresponding pixels. Thus, a brightness value can be set to be the value of the nearest neighbor pixel or calculated by an interpolation scheme such as linear interpolation based on the values of the nearest four pixels. This is described using FIG. 8. The center position of the bit cell in the image plane which has been obtained in STEP S403 is assumed to be at a point 801 shown in the figure. The coordinate values of the point 801 are not integer values, indicating the point 801 does not correspond to the center of a pixel in the image. In the processing of STEP S404, the brightness of this point 801 is obtained. The brightness calculation using the value of the nearest neighbor pixel mentioned above means in this example that the value of a pixel 802 which is the nearest from the point 801 is used as the brightness value of the point 801. The brightness calculation using a linear interpolation scheme mentioned above means that a brightness value is interpolated from the values of pixels 802, 803, 804, and 805 which are the nearest four pixels.

Then, at STEP S405, the obtained brightness value is converted into a bit value. The simplest bit conversion scheme is threshold processing in which the brightness value is determined to be 0 or 1 through comparison between the brightness value and a predetermined threshold value. As the predetermined threshold value, the value used in the binarization processing of STEP S402 may be used. However, any other scheme to determine a threshold value can also be employed. Further, the processing of STEP S405 can be incorporated into a process to be performed after the bit conversion processing has been performed on all bit cells at STEP S406, instead of being performed between the processing of STEP S404 and STEP S406. In this case, it may also be possible that the brightness value of every bit cell is obtained in every processing of STEP S403 and STEP S404, and then the obtained brightness values are converted into a bit value on the basis of a distribution of the brightness values.

In the foregoing, the processing is described in which bit values are read from a two-dimensional code in the shape of a regular hexagon having a region inside of which is divided into interlocking regular hexagonal cells, according to this exemplary embodiment. Since a regular hexagon has rotational symmetry, the foregoing processing procedure does not provide information as to which direction in a projected image corresponds to the top of an index, for example. In view of this, a scheme can be used in which a color (black or white) is assigned to each of a plurality of predetermined cells in advance so that a direction of rotation of the index can be determined. Alternatively, another cell may be disposed outside the hexagonal contour so that the rotation direction can be determined, as in the case of "two-dimensional code 5".

In the foregoing, the description of a method for reading bit values from a two-dimensional code having a regular hexagonal contour and interlocking regular hexagonal cells inside the hexagonal contour is provided. Such a two-dimensional code is advantageous for the following reasons.

Figure 9A:
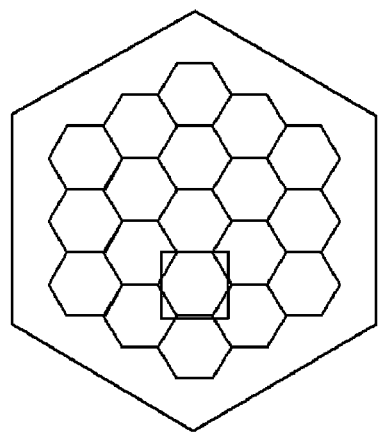
FIGS. 9A to 9D are schematic diagrams illustrating comparison between a bit cell of a two-dimensional code according to an exemplary embodiment of the present invention and a bit cell of a two-dimensional code according to a known technique.
Figure 9B:
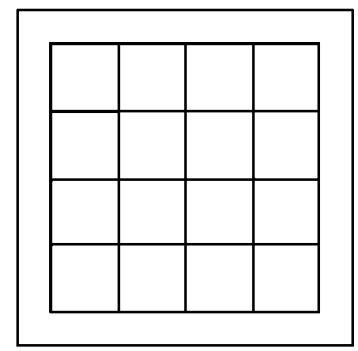
Figure 9C:
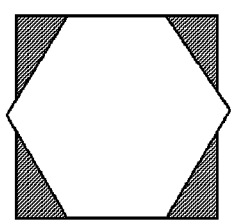
Figure 9D:
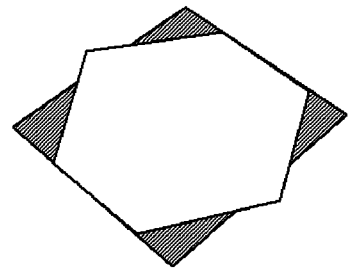

FIG. 9A shows a two-dimensional code which is the same as the two-dimensional code shown in FIG. 1B, having interlocking regular hexagonal bit cells arranged in the interior region of the two-dimensional code according to this exemplary embodiment. FIG. 9B illustrates a case where bit cells are arranged in accordance with a scheme similar to that used in "two-dimensional code 5" of Related Art 2. As shown in the figure, interlocking square cells are arranged in the interior region. FIG. 9C illustrates a case where one of the cells shown in FIG. 9A is overlaid onto one of the cells shown in FIG. 9B. As can be seen from the figure, the distance between opposing sides of the hexagonal cell is the same as that between opposing sides of the square cell. As described above, images of these two-dimensional codes are captured from any angle. Thus, when images of the individual cells shown in FIG. 9C are captured by a camera and then overlaid together, an image shown in FIG. 9D can be obtained. Normally, a camera has pixels arranged in a grid, so that brightness and colors of an external object or the like are acquired as values of the pixels. Thus, as described above using FIG. 8 in conjunction with the processing of STEP S403, the brightness or color of each of the bit cells shown in FIG. 9C is to be obtained from the pixel value of the nearest neighbor pixel or the pixel values of the four nearest pixels with respect to the center point of the bit cell in the projected image. As can be seen from FIG. 9D, when the bit cell is square, the sizes of portions in the vicinity of the vertices of the quadrangular projected in the image are increased, since these vertices are more distant from the center point compared with the vertices of the hexagon in the image. This indicates that these portions in the vicinity of the vertices of the quadrangle rarely affect the brightness or color of the center point. Since capturing of an image of this two-dimensional code is performed on the premise that the image of the code can be captured from various directions, the size of a bit cell can be decreased by defining a bit cell by points that are the same distance from the center point. That is, a shape of a bit cell which is as close to a circle as possible is desired to decrease the size of the bit cell. Although the size of the bit cell shown in FIG. 9A is 0.866 times of the bit cell shown in FIG. 9B, these bit cells have generally the same minimum readable bit size when their images are to be captured from various directions. While the two-dimensional code of FIG. 9A contains 19 bit cells, the two-dimensional code of FIG. 9B contains only 16 cells. However, the area of a total of 19 bit cells shown in FIG. 9A is generally same of that of a total of 16 bit cells shown in FIG. 9B. Thus, according to the present exemplary embodiment of the present invention, the increased number of bits can be recorded in a two-dimensional code without increasing the size of the two-dimensional code.

Figure 2A:
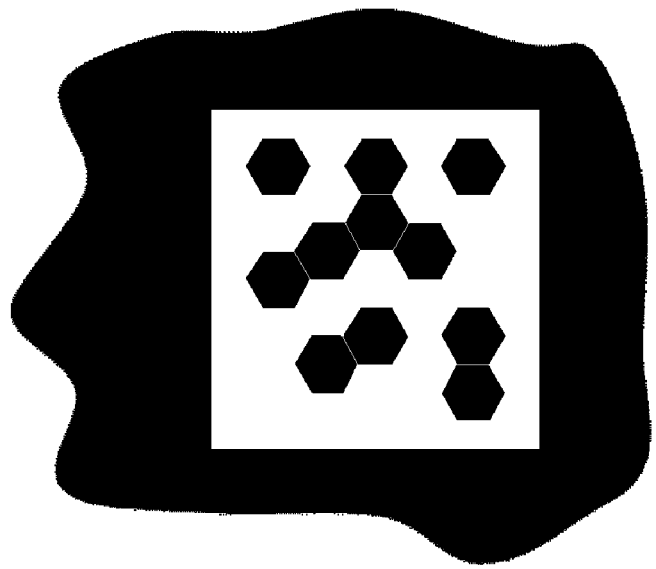
FIGS. 2A to 2C illustrate a configuration of another two-dimensional code according to an exemplary embodiment of the present invention.
Figure 2B:
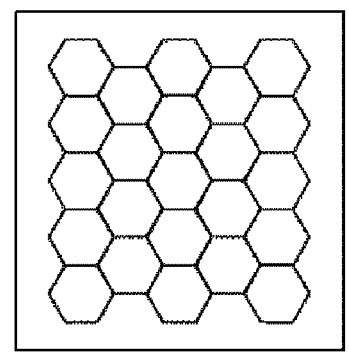
Figure 2C:
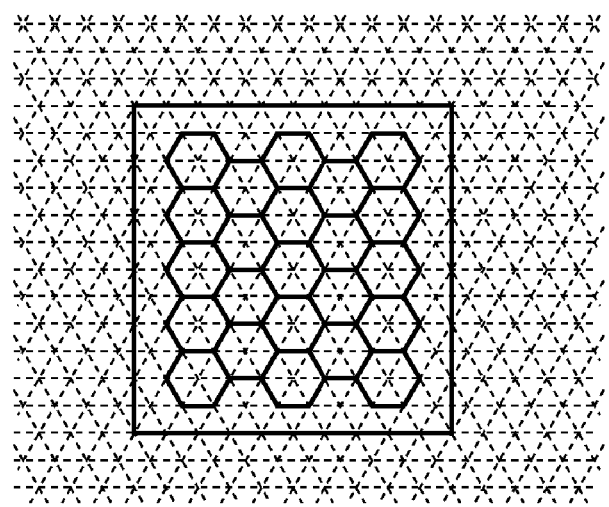

The two-dimensional code of the first exemplary embodiment is composed of an exterior region having a regular hexagonal contour and an interior region disposed in the exterior region in which regular hexagonal bit cells are arranged as illustrated in FIG. 1. However, the shapes of the contour and each bit cell do not need to be regular hexagons and can be any hexagonal shapes. For example, the two-dimensional code may have such a rectangular contour as illustrated in FIG. 2. The essence of the present invention can be accomplished as long as interlocking hexagonal bit cells are arranged at a predetermined distance from the contour of a two-dimensional code, and the position of each bit cell in a projected image plane can be determined on the basis of the shape of the (deformed) contour in the projected image plane.

In addition, as an example of an embodiment of the present invention, the case is described where each of bit cells is assigned with a color (black or white), and the brightness of each cell is converted into a binary value (1 or 0) through threshold processing. However, as a modification of the above embodiment, it is also possible that a plurality of brightness values is used so as to be converted into n values. It is further possible that a plurality of different colors are assigned to individual cells. Also in this case, the colors of the individual cells can be obtained through, for example, the nearest neighbor technique or an interpolation technique such as the bilinear interpolation using neighbor pixels as described above. Then, a plurality (m colors) of registered color candidates which are closest to the obtained colors is selected so as to be assigned to the individual cells. Thus, the bit cells can be converted into up to m values.

Second Exemplary Embodiment

Figure 10A:
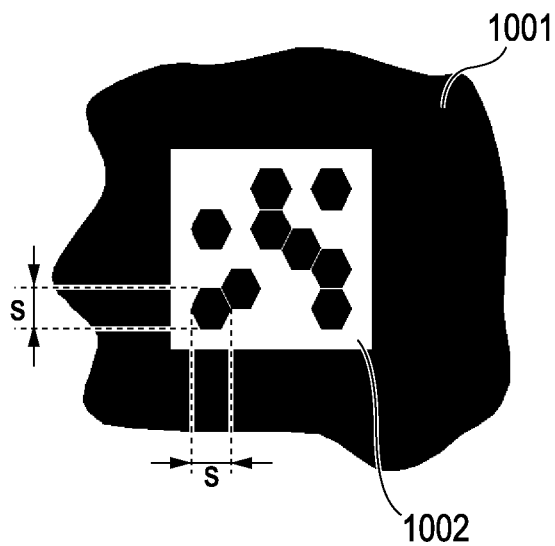
FIGS. 10A to 10D illustrate configurations of two-dimensional code according to an exemplary embodiment of the present invention.

FIGS. 10A to 10D illustrate a two-dimensional code according to the second exemplary embodiment of the present invention. Referring to FIG. 10A, a two-dimensional code 1002 is formed on a black background 1001. The two-dimensional code 1002 has a white-colored exterior region having a square contour and an exterior region provided at a predetermined distance from the contour. The internal region is divided into hexagonal cells which are interlocked together. Each of the hexagonal cells has equal height and width and is colored black or white.

Figure 10B:
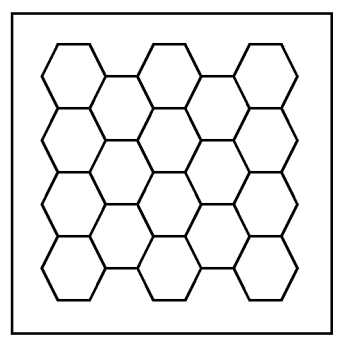
Figure 10C:
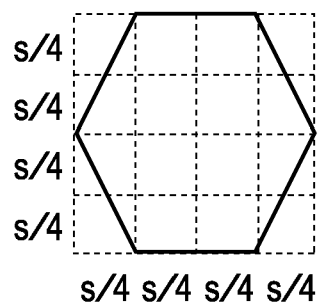
Figure 10D:
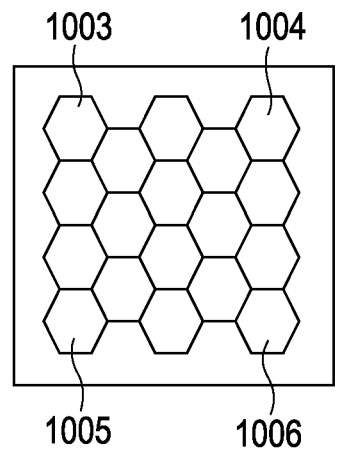

FIG. 10B illustrates a relationship between the hexagonal cells and the square contour. FIG. 10C illustrates one hexagonal cell and a quadrangle as additional lines having equal height and width. A value "s" in the figure is the height and width of the hexagonal cell and quadrangle. Two vertices of the hexagonal cell are positioned at the mid-points of the right side and the left side of the quadrangle, and remaining four vertices are positions on upside and downside of the quadrangle, each of which is s/4 distant from the right or left side. FIG. 10D illustrates four hexagonal cells 1003, 1004, 1005, and 1006 each of which is positioned in the nearest vicinity of an individual vertex of the square contour. These hexagonal cells are to be employed in the processing of STEP S1103 to S1106. Each of the hexagonal cells 1003, 1004, 1005, and 1006 is filled with a predetermined color: white, black, black, black, respectively, in this example.

FIG. 11 is a flowchart illustrating a processing procedure according to this exemplary embodiment which is performed using the two-dimensional code detector described above.

At STEP S1101, an image of the two-dimensional code shown in FIG. 10 is captured by the camera 201, and the captured image is acquired through the image loading unit 202. At STEP S1102, a quadrangle, which is the contour of the two-dimensional code, is detected from the captured image.

Figure 12A:
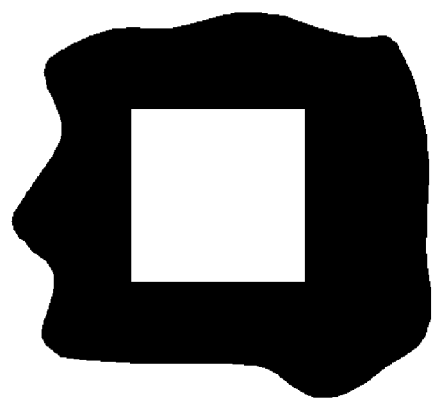
FIGS. 12A to 12E are schematic diagrams illustrating a method for detecting a square contour of a two-dimensional code.
Figure 12B:
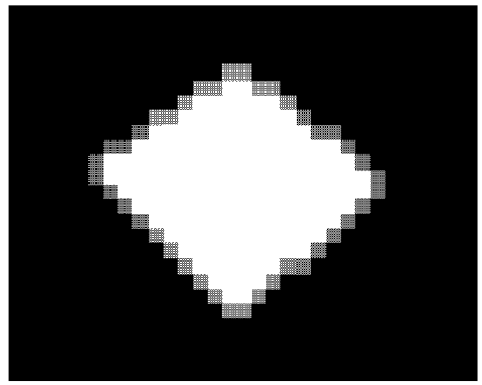
Figure 12C:
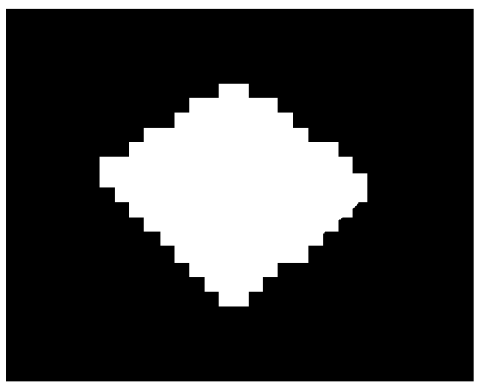
Figure 12D:
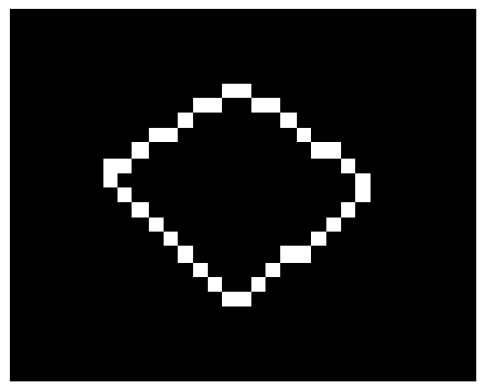
Figure 12E:
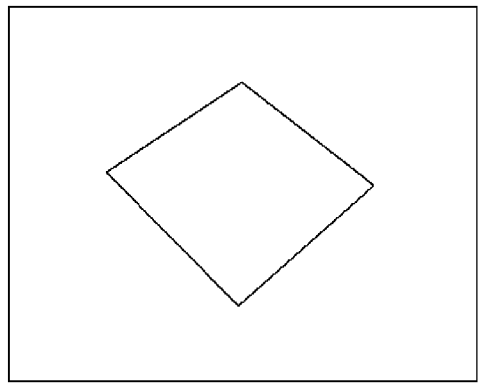

Referring to FIGS. 12A to 12E, this processing of STEP S1102 for detecting the contour will be described. FIG. 12A illustrates the shape of the index when viewed from a position at which the visual axis is perpendicular to the plane of the index. In this description, the interior bit cells are disregarded and not shown in the figure. FIG. 12B illustrates an example of an image of the index captured by the camera. Even when the original shape of the index is square, it appears not to be a square but be a convex quadrangle in the captured image, unless it is captured from a position at which the optical axis of the camera is perpendicular to the plane of the index. In addition, the index can be oriented in any direction in the image plane. Further, each of the white and black cells represents the level of brightness in the image, and a border region between the black and white regions is observed as having a brightness of an intermediate level. FIG. 12C shows a binary image obtained by binarizing the image shown in FIG. 12B. This image binarization can be realized through simple threshold processing. However, any binarization scheme can be applied to obtain such an image. From this binary image, pixels forming the contour of the white-colored region are detected through a pixel tracing technique, so that a pixel alignment forming a closed loop having a width of one pixel as illustrated in FIG. 12D is obtained. When broken line approximation is performed on this pixel alignment, a quadrangle illustrated in FIG. 12E is obtained. At this time, in a case where the shape of an original index is not square, it can be found through the broken line approximation that the number of break points is not four. Thus, it can be determined whether or not the original shape is square. In the above description of the processing of STEP S1102, the bit cells in the interior region of the index are not mentioned. Since a space is provided between the interior bit cells and the square contour, the interior cells do not affect the processing of STEP S1102 as long as the index occupies more than a predetermined amount of area in the entire image (i.e., width of the space is more than the width of one pixel in the captured image).

Figure 13:
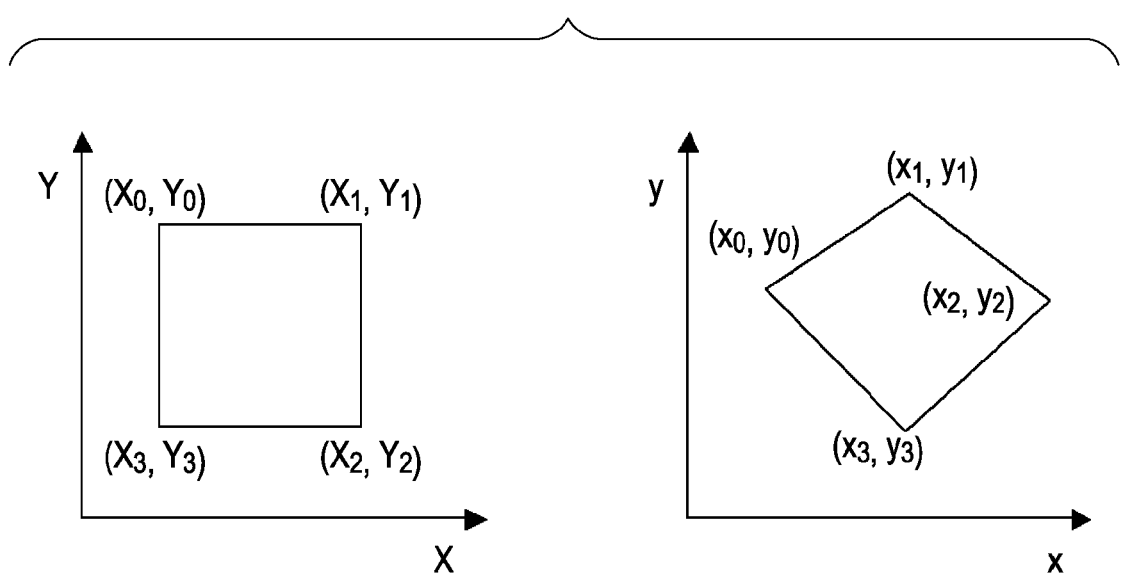
FIG. 13 is a schematic diagram showing an original square contour of a two-dimensional code and a contour of the two-dimensional code obtained on a projected image and illustrating projective transformation between the original contour and projected contour.

Then, at STEP S1103, the center positions of the individual interior bit cells 1003, 1004, 1005, and 1006 shown in FIG. 10D, which are provided in the nearest vicinity of the four vertices of the two-dimensional code, are calculated on the basis of the detected quadrangular perimeter (contour) in the image plane. This calculation is described with reference to FIG. 13. As shown in the figure, the vertices of the square, which is the original contour of the index, are ordered as (Xn, Yn) (n=0, 1, 2, 3), and the vertices of the quadrangular contour detected in the image are ordered as (xn, yn). These contours can be related by two-dimensional projective transformation expressed by the equations below.

$$x_n = \frac{H_{11}X_n + H_{12}Y_n + H_{13}}{H_{31}X_n + H_{32}Y_n + 1}, y_n = \frac{H_{21}X_n + H_{22}Y_n + H_{23}}{H_{31}X_n + H_{32}Y_n + 1} \qquad (4)$$

This relational expression can be written as a homogeneous coordinate transformation equation by a matrix operation shown below.

$$\begin{bmatrix} wx_n \\ wy_n \\ w \end{bmatrix} = \begin{bmatrix} H_{11} & H_{12} & H_{13} \\ H_{21} & H_{22} & H_{23} \\ H_{31} & H_{32} & 1 \end{bmatrix} \begin{bmatrix} X_n \\ Y_n \\ 1 \end{bmatrix} \qquad (5)$$

In this case, the matrix $$\begin{bmatrix} H_{11} & H_{12} & H_{13} \\ H_{21} & H_{22} & H_{23} \\ H_{31} & H_{32} & 1 \end{bmatrix} \qquad (6)$$

is called a homography matrix. The vertices (Xn, Yn) and (xn, yn) have four corresponding points. Four relational expressions of the equation (4) and the associated equation (5) can be derived. In other words, by solving simultaneous equations, eight parameters H11, H12, H13, H21, H22, H23, H31, and H32 in the above homography matrix (6) or the equation (4) can be derived from the relations between the four corresponding points.

Once the relational expressions shown in the equation (4) or the associated equation (5) are obtained, any point in space (X, Y) can be mapped into space (x, y). That is, the equation allows calculation of the position where the center point of an arbitrary bit cell in the index appears on a projected image. Note that an important feature of this exemplary embodiment is that the center points of the cells 1003, 1004, 1005, and 1006 are on the diagonals of the square perimeter (contour). In a square, the distance between the upside and downside is equal to the distance between the right sides and left side. Thus, the center positions of the four hexagonal cells on the image plane can be obtained on the basis of the detected quadrangular perimeter (contour), regardless of the direction in which the image of the square contour of two-dimensional code is oriented. However, it is not possible to distinguish the individual cells 1003, 1004, 1005, and 1006 from each other only on the basis of the quadrangular contour in the image. In other words, in the processing of STEP S1103, the center points of the four hexagonal cells are obtained while the individual cells are not distinguished from each other.

Subsequently, at STEP S1104, brightness values of the obtained center positions of the four hexagonal cells are obtained using a scheme similar to that employed in the processing of STEP S403 described with reference to FIG. 4.

Then, at STEP S1105, each of the obtained brightness values is converted into a binary value (black or white). The simplest bit conversion scheme is threshold processing in which the brightness value is determined to be 0 or 1 (white or black) through comparison between the brightness value and a predetermined threshold value. As the predetermined threshold value, the value used in the binarization processing of STEP S1102 may be used. However, any scheme to determine a threshold value can be employed. Through the processing of STEP S1103 to STEP S1105, the color (black or white) of each of the hexagonal cells positioned in the nearest vicinity of the individual vertices has been determined. On the basis of this result, a rotation direction (orientation) of the two-dimensional code in the image can be determined, at STEP S1106. In this determination processing, since the cells 1003, 1004, 1005, and 1006 have been colored white, black, black, and black, respectively, as described above, the color of each cell can be identified by comparing those brightness values of the cells obtained in the processing of STEP S1104.

Through the processing described above, it is determined how the two-dimensional code projected on the image plane is deformed from the original shape, and which direction the two-dimensional code is oriented in the image plane. Now, on the basis of the above results, processing for reading out the interior bit cells is to be performed. At STEP S1107, the center position of any one of the bit cells (other than the bit cells 1003, 1004, 1005, and 1006 in FIG. 10D) on the image plane is calculated using the equation (4) or (5). Then, at STEP S1108, the brightness value of the center point of the cell in the image plane is acquired. This processing for acquiring the brightness value is similar to the processing of STEP S1104. At STEP S1109, the obtained brightness value is converted into a bit value. This conversion processing is similar to the processing of STEP S1105 in which the brightness values of the four hexagonal cells are converted into binary values and implemented through threshold processing or the like. At STEP S1110, it is determined whether or not processing has been performed on all of the bit cells. If the result is negative, the processing of STEP S1107 to STEP S1109 will be repeated until the processing has been performed on all of the bit cells. In addition, the processing of STEP S1109 can be incorporated in processing to be performed after the bit conversion processing has been performed on all bit cells at STEP S1110, instead of being performed between the processing of STEP S1108 and STEP S1110. In this case, the brightness values of all of the bit cells have been obtained when the processing of STEPS S1107, S1108, and S1110 is performed. Therefore, it is also possible that each of the brightness values is converted into a bit value on the basis of a distribution of the obtained brightness values at every processing of STEPS S1107, S1108, and S1110.

In the foregoing, the description of processing for reading bit values from a two-dimensional code having a square contour and interlocking cells, each in the shape of hexagon having equal height and width, in the interior of the square contour. The detector and the method for detecting the hexagon on the basis of the square contour are also described above. Such a two-dimensional code is advantageous for the following reasons.

Figure 14A:
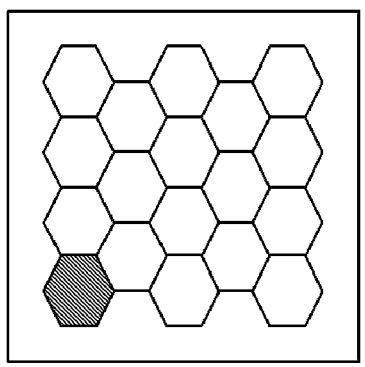
FIGS. 14A to 14D are schematic diagrams illustrating comparison between a bit cell of a two-dimensional code according to an exemplary embodiment of the present invention and a bit cell of a two-dimensional code according to a known technique.
Figure 14B:
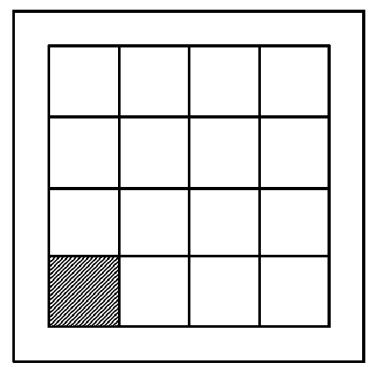
Figure 14C:
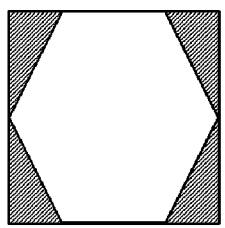
Figure 14D:
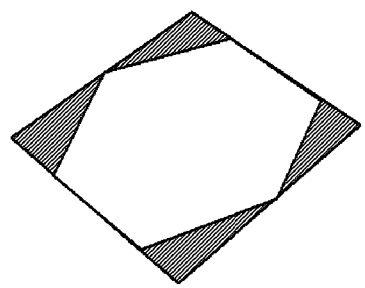

Referring to FIG. 14A, a two-dimensional code which is basically same as that shown in FIG. 10B is illustrated. Abutting bit cells each having the shape of a hexagon with equal height and width are arranged in the interior of the regular hexagonal contour of the two-dimensional code which is implemented in this exemplary embodiment. FIG. 14B illustrates a case where abutting square bit cells are provided using a scheme similar to that employed for "two-dimensional code 5" of Related Art 2 described above. As shown in the FIGS. 14A and 14B, one of the hexagonal cells and one of the square cells are hatched. In the figures, the cell of the FIG. 14A appears smaller than the cell of the FIG. 14B. However, when they are overlaid together, as shown in FIG. 14C, the cell of FIG. 14B is larger than the cell of FIG. 14A by only small spaces. These two-dimensional codes are to be image-captured by a camera from any direction, as described above. Thus, when captured images of the cells of FIGS. 14A and 14B are overlaid together, such an image shown in FIG. 14D can be obtained. Normally, a camera has pixels arranged in a grid, so that brightness and colors of an external object or the like are obtained as the values of the pixels. Thus, as described above using FIG. 6 in conjunction with the processing of STEP S1103 and STEP S1107, the brightness or color of each of these bit cells are obtained from the pixel value of the nearest neighbor pixel or the pixel values of the four nearest pixels on the basis of the center point of the bit cell in the projected image. As can be seen from FIG. 14D, when the bit cell is square, the sizes of portions around the vertices of the quadrangular in the image plane are increased, since these vertices are more distant from the center point compared with the vertices of the hexagon. This indicates that these portions rarely affect the brightness or color of the center point. Since images of these two-dimensional codes are to be captured from various directions, the size of a bit cell can be decreased by defining a bit cell by points that are the same distance from the center point. That is, a shape of the contour of a bit cell which is as close to a circle as possible is desired to decrease the size of the bit cell. In other words, the two-dimensional codes of FIGS. 14A and 14B, when image-captured on the basis of that premise, these bit cells have generally the same minimum readable bit size. However, the two-dimensional code in FIG. 14B has only 16 bit cells whereas the two-dimensional code in FIG. 14A has 18 bit cells. Thus, according to an exemplary embodiment of the present invention, the increased number of bits can be recorded in a two-dimensional code without negatively affecting the minimum recognizable size of the code.

Figure 16:
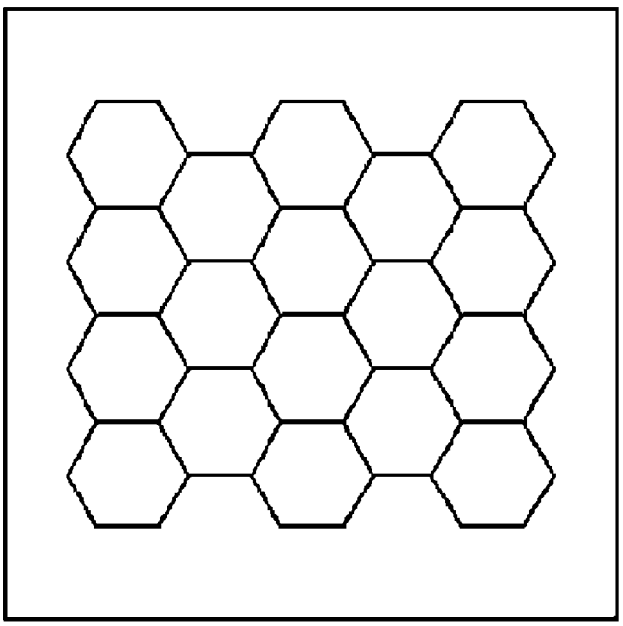
FIG. 16 illustrates an example of an index based on a hexagonal contour, which is a type of two-dimensional codes according to a known technique.

In addition, setting the height and width of each hexagonal bit cell to be equal brings about the following advantage. The square contour of a two-dimensional code is a very important feature when the code is used for MR applications. When the position and orientation of a camera is estimated, the square contour will not produce specific directivity in observing the two-dimensional code, permitting observation from various viewpoints. However, if the shape of each bit cell is set to be a regular hexagon while the shape of the square contour remains the same, it is difficult to arrange interlocking bit cells in the interior of the square contour while providing a constant distance between the contour and the cells. For example, as shown in FIG. 16, a distance provided between the top side or bottom side of the contour and the bit cells is longer than a distance provided between the right side or left side of the contour and the bit cells. In other words, unlike the two-dimensional code shown in FIG. 10D, the positions of the four center points of the regular hexagonal cells in the vicinity of four vertices of the square contour of FIG. 16 are not symmetric with respect to the diagonals (i.e., the center points are not on the diagonals of the square contour). Thus, in this case, it is not possible to determine a rotation direction or orientation of the quadrangular contour in the image plane on the basis of the quadrangular contour detected through the processing of STEP S1103 to STEP S1106. Since the positions of the individual bit cells are not diagonally symmetric, it is not possible to obtain the center points of the bit cells from the result of the detection of the contour performed before the orientation of the quadrangular contour in the image plane is determined. On the other hand, when a bit cell having the shape of a hexagon with equal height and width as shown in FIG. 10D is employed, it is possible to arrange the center positions of four bit cells in the nearest vicinity of the vertices of the square contour so as to be symmetric with respect to the vertices (the center points are on the diagonals). The center points of bit cells other than these four bit cells can be calculated after the orientation of the quadrangular contour in the image plane is detected using these four bit cells. In addition, it may also be possible that the orientation of the quadrangle in the image plane is determined by providing an index outside of the square contour, similarly to "two-dimensional code 5" of Related Art 2. However, in such a case, the overall size of the two-dimensional code is increased. If such a large space can be used for an index, the size of the square contour can be increased, and thus the greater number of bits could be allocated in the index, according to an exemplary embodiment of the present invention.

Figure 17:
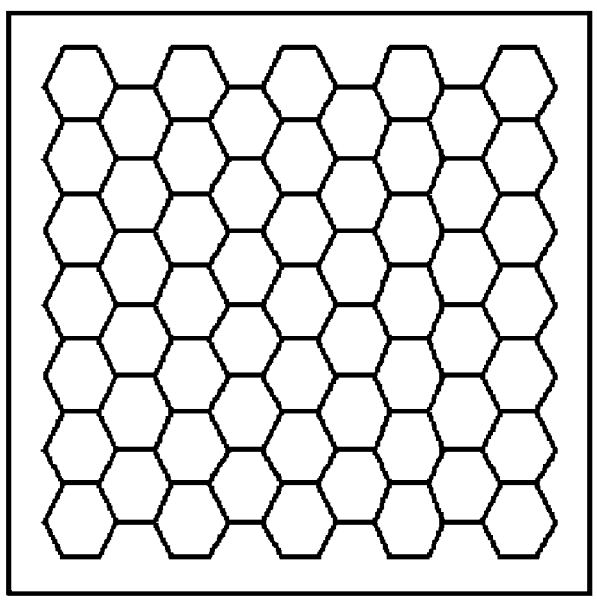
FIG. 17 illustrates an example of an index based on a hexagonal contour, which is a type of two-dimensional codes according to a known technique.
Figure 18:
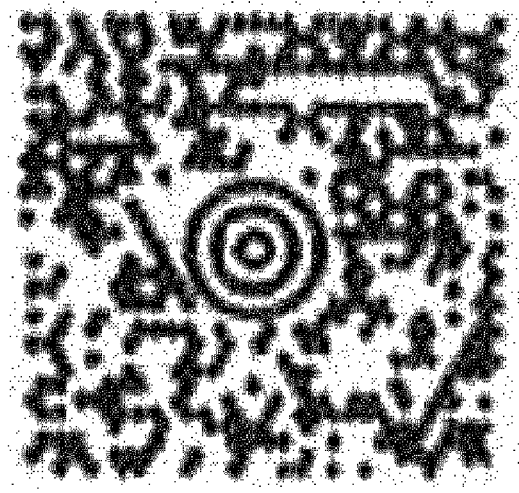
FIG. 18 illustrates an example of an index based on a hexagonal contour, which is a type of two-dimensional codes according to a known technique.
Figure 19:
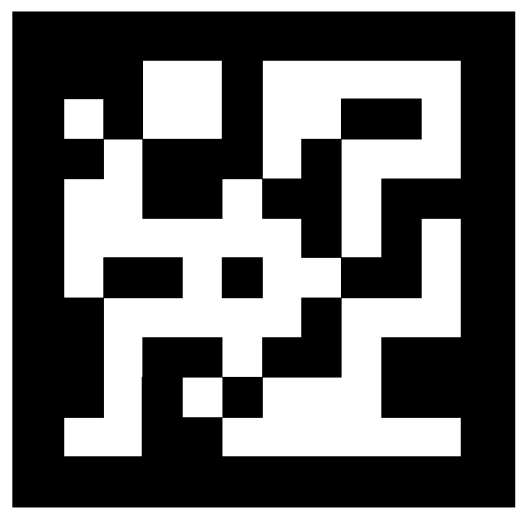
FIG. 19 illustrates an example of an index based on a hexagonal contour, which is a type of two-dimensional codes according to a known technique.
Figure 20:
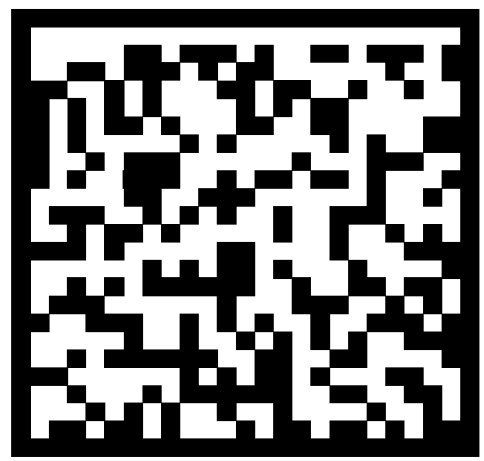
FIG. 20 illustrates an example of an index based on a hexagonal contour, which is a type of two-dimensional codes according to a known technique.
Figure 21:
FIG. 21 illustrates an example of an index based on a hexagonal contour, which is a type of two-dimensional codes according to a known technique.
Figure 22:
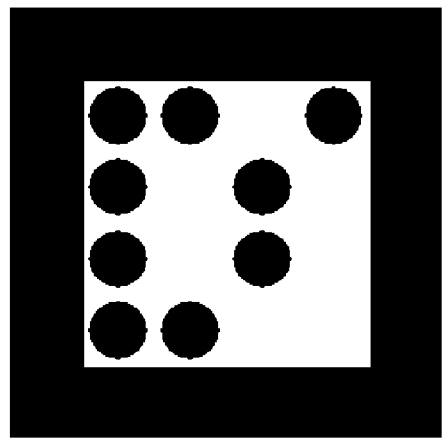
FIG. 22 illustrates an example of an index based on a hexagonal contour, which is a type of two-dimensional codes according to a known technique.
Figure 23:
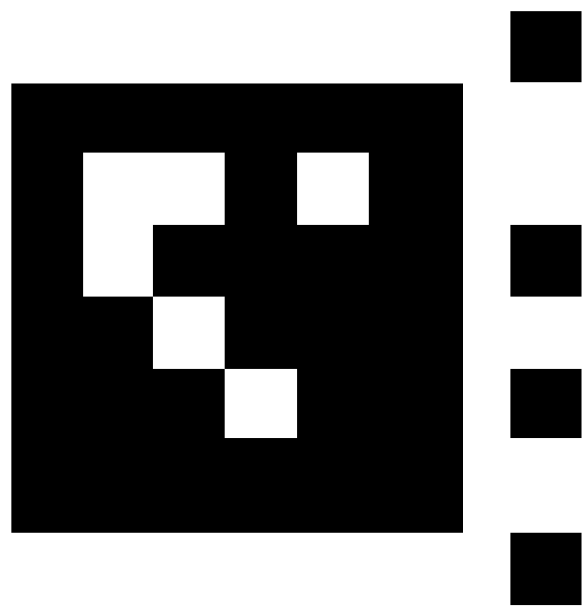
FIG. 23 illustrates an example of an index based on a hexagonal contour, which is a type of two-dimensional codes according to a known technique.

When it is desired to express a greater number of bit values in a two-dimensional code, a greater number of bit cells can be arranged as shown in FIG. 17. Thus, a bit cell having equal height and width facilitates arrangement of bit cells in a square.

In the above exemplary embodiment, each bit cell is colored either black or white, and the brightness value of the bit cells is converted into a binary bit value (1 or 0) through threshold processing. However, it is also possible that a plurality of brightness values is be used which are to be converted into n grey scale values. It is further possible that a plurality of different colors are assigned to individual cells. Also in this case, the colors of the individual cells can be obtained through, for example, the nearest neighbor technique or an interpolation technique such as the bilinear interpolation using neighbor pixels as described above. Then, a plurality (m colors) of registered color candidates which are closest to the obtained colors is selected so as to be assigned to the individual cells. Thus, the bit cells can be converted into up to m color values.

Figure 15:
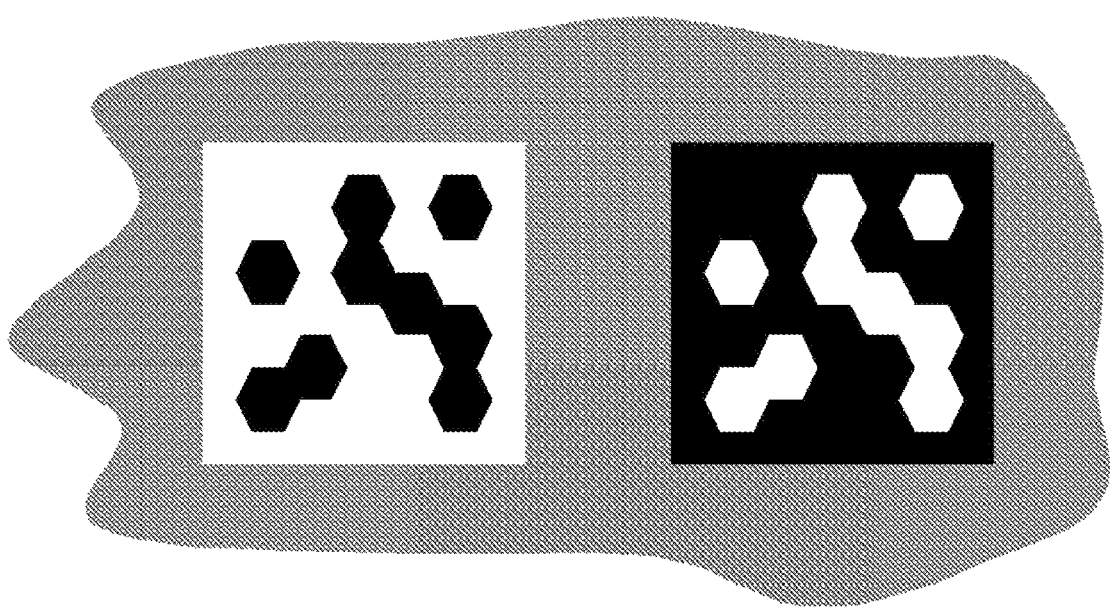
FIG. 15 illustrates two-dimensional codes one having a white exterior region on which bit cells are provided and another having a black exterior region on which bit cells are provided.

In the above exemplary embodiment, the exterior region within the square contour is filled with white, and the individual bit cells are expressed by black and white. However, the exterior region may be filled with black or any other halftones or colors. Further, as shown in FIG. 15, a two-dimensional code having black border region and a two-dimensional code having white border region can be used together so that additional one bit can be expressed by the colors of the exterior regions.

Moreover, in the above exemplary embodiment, the case is described where the bit cells 1003, 1004, 1005, and 1006 are filled with white, black, black, and black, respectively, for determining the rotation direction or orientation of the two-dimensional code. However, other color arrangement, such as black, white, white, white, can be employed. In addition, a two-dimensional code having a two-dimensional code having the arrangement of white, black, black, and white and a two-dimensional code having the arrangement of black, white, white, and white can be used together so that an additional one bit can be expressed by the difference between the arrangements.

Other Exemplary Embodiments

Functions similar to the functions of the two-dimensional code detector described above may also be realized using a system constituted by a plurality of apparatuses.

The present invention also encompasses arrangements wherein a software program for realizing the functions of the above-described embodiments is supplied to a system or device having a computer capable of executing the program either directly from a recording medium or via cable or wireless communication, such that equivalent functions are achieved by executing the program supplied to the computer of the system or device.

Thus, program code to be supplied and installed to the computer for realizing the functions of the above-described embodiments is also a feature that realizes the present invention. That is, the computer program for implementing the function of the above-described embodiments may be encompassed in the present invention.

In this case, the program is not restricted to any form, such as object code, a program executed by an interpreter, script data supplied to the Operating System, or the like.

Examples of the recording medium for supplying the program include magnetic recording media such as flexible disks, hard disks, magnetic tape, and so forth, optical/magneto-optic recording media such as magneto-optical (MO), compact disk-read-only memory (CD-ROM), CD-recordable (CD-R), CD-rewriteable (CD-RW), digital versatile disk-ROM (DVD-ROM), DVD-R, DVD-RW, and so forth, non-volatile semiconductor memory, and so forth.

Examples of methods for supplying the program via cable/wireless communication include storing, on a server on a network, a data file (program data file) which can serve as the computer program realizing the present invention on a client computer, such as the computer program itself, a compressed and self-extracting file with automatic installation functions, or the like, and downloading the program data file to a client computer which accesses the server. In this case, the program data file may be segmented into multiple segment files, and have the segment files stored on different servers. That is to say, a server device may download the program data file for realizing the function processing of the present invention to multiple users.

That is, server devices for downloading program data files for realizing the functions of the above exemplary embodiments to a plurality of users are also encompassed in the present invention.

Also, an arrangement may be made wherein the program according to the present invention is encrypted and stored in a recording medium such as a CD-ROM and distributed to the user in this state, with key information for decrypting the encryption being downloaded from an Internet homepage, for example, to users which satisfy certain conditions, so that the encrypted program can be executed and installed to the computer using the key information.

Also, in addition to the functions of the above-described embodiment being realized by the program read out being executed on a computer, the functions of the above-described embodiment may be realized by the Operating System running on the computer performing part or all of the actual processing based on instructions of the program.

Moreover, the functions described above may be realized by the program read out from the recording medium being written to memory provided to a function expansion board inserted to the computer or function expansion unit connected to the computer, following which the OS running on the computer performs part or all of the actual processing based on instructions of the program.

As many apparently widely different embodiments of the present invention can be made without departing from the scope thereof, it is to be understood that the invention is not limited to the specific embodiments thereof except as defined in the appended claims.

This application claims the priority of Japanese Application No. 2005-339079 filed on Nov. 24, 2005 and No. 2005-

339080 filed on Nov. 24, 2005, which are hereby incorporated by reference herein in their entirety.

What is claimed is:

1. A two-dimensional code comprising:
an exterior region distinguishable from a background based on brightness or color, the exterior region having a square contour; and
an interior region disposed such that a distance provided between a top side or a bottom side of the exterior region and the interior region is equal to a distance provided between a right side or a left side of the exterior region and the interior region,
wherein the interior region is divided into cells of a predetermined size so that information is represented by brightness or color of each of the cells,
wherein the cells, each having the shape of a hexagon, are disposed so as to abut each other,
wherein the hexagon has equal height and width,
wherein two vertices of the hexagon are positioned at midpoints of a right side and a left side of a quadrangle whose length of each side is equal to the height and the width of the hexagon, the quadrangle being circumscribed to the hexagon, and
wherein four other vertices of the hexagon are positioned upside and downside of the quadrangle.

2. The two-dimensional code of claim 1,
wherein four hexagonal cells each arranged in the vicinity of one of four vertices of the quadrangular exterior region are used to determine an orientation of the two-dimensional code.

3. A method for detecting a two-dimensional code comprising the steps of:
detecting a polygonal exterior region of two-dimensional code projected on an image from a background;
identifying a position of an interior bit cell in accordance with a shape of the polygonal exterior region in the image; and
acquiring a bit value based of brightness or color of the bit cell in the image,
wherein the two-dimensional code includes an exterior region, which has a square contour, distinguishable from the background based on the brightness or color and an interior region disposed such that a distance provided between a top side or a bottom side of the exterior region and the interior region is equal to a distance provided between a right side or a left side of the exterior region and the interior region, the interior region having a plurality of hexagonal bit cells, the bit cells disposed so as to abut each other,
wherein each hexagon bit cell has equal height and width,
wherein two vertices of each hexagon bit cell are positioned at midpoints of a right side and a left side of a quadrangle whose length of each side is equal to the height and the width of the hexagon, the quadrangle being circumscribed to the hexagon, and
wherein four other vertices of the hexagon are positioned upside and downside of the quadrangle.

4. The method of claim 3,
wherein the identifying step includes the steps of:
calculating information representing two-dimensional projective transformation, from a relationship between a shape of the exterior region detected in the detecting step and an actual shape of a corresponding physical exterior region; and
calculating a position of each of the bit cells in the image using information representing two-dimensional projective transformation.

5. The method of claim 3,
wherein the exterior region has a shape of a quadrangle.

6. The method of claim 3,
wherein four hexagonal cells each arranged in a vicinity of one of four vertices of the exterior region are used to determine an orientation of the two-dimensional code.

7. A computer-readable recording medium having computer-readably stored therein a program for executing a method for detecting a two-dimensional code comprising:
detecting a polygonal exterior region of two-dimensional code projected on an image from a background;
identifying a position of an interior bit cell in accordance with a shape of the polygonal exterior region in the image; and
acquiring a bit value based on brightness or color of the bit cell in the image,
wherein the two-dimensional code includes an exterior region, which has a square contour, distinguishable from the background based on the brightness or color and an interior region disposed such that a distance provided between a top side or a bottom side of the exterior region and the interior region is equal to a distance provided between a right side or a left side of the exterior region and the interior region, the interior region having a plurality of hexagonal bit cells, the bit cells disposed so as to abut each other,
wherein each hexagon bit has equal height and width,
wherein two vertices of each hexagon bit are positioned at midpoints of a right side and a left side of a quadrangle whose length of each side is equal to the height and the width of the hexagon, the quadrangle being circumscribed to the hexagon, and
wherein four other vertices of the hexagon are positioned upside and downside of the quadrangle.

8. A two-dimensional code detector comprising:
a polygonal exterior region detecting device adapted to detect from a background a polygonal external region of a two-dimensional code projected on an image;
a bit cell identifying device adapted to identify a position of an interior bit cell in accordance with a shape of the polygonal exterior region in the image; and
a bit value acquiring device adapted to acquire a bit value based on brightness or color of the bit cell in the image,
wherein the two-dimensional code includes an exterior region, which has a square contour, distinguishable from the background based on the brightness or color and an interior region disposed such that a distance provided between a top side or a bottom side of the exterior region and the interior region is equal to a distance provided between a right side or a left side of the exterior region and the interior region, the interior region having a plurality of hexagonal bit cells, the bit cells disposed so as to abut each other,
wherein each hexagon bit has equal height and width,
wherein two vertices of each hexagon bit are positioned at midpoints of a right side and a left side of a quadrangle whose length of each side is equal to the height and the width of the hexagon, the quadrangle being circumscribed to the hexagon, and
wherein four other vertices of the hexagon are positioned upside and downside of the quadrangle.

* * * * *